United States Patent
Niemi et al.

(10) Patent No.: US 7,965,897 B2
(45) Date of Patent: *Jun. 21, 2011

(54) METHOD FOR PROCESSING A DIGITAL IMAGE AND IMAGE REPRESENTATION FORMAT

(75) Inventors: Sami Niemi, Skanör (SE); Karl-Anders Johansson, Malmö (SE); Johan Stén, Malmö (SE)

(73) Assignee: Scalado AB, Lund (SE)

(*) Notice: Subject to any disclaimer, the term of this patent is extended or adjusted under 35 U.S.C. 154(b) by 0 days.

This patent is subject to a terminal disclaimer.

(21) Appl. No.: 12/654,868

(22) Filed: Jan. 7, 2010

(65) Prior Publication Data

US 2010/0172592 A1 Jul. 8, 2010

Related U.S. Application Data

(63) Continuation of application No. 12/314,673, filed on Dec. 15, 2008, now Pat. No. 7,831,101.

(51) Int. Cl.
*G06K 9/36* (2006.01)
(52) U.S. Cl. ........ 382/232; 382/233; 382/244; 382/245; 382/246; 382/250; 358/426.01
(58) Field of Classification Search .................. 382/232, 382/233, 278, 238, 244, 246, 248, 249, 250, 382/251; 341/65, 67; 358/426.01, 426.07, 358/426.15, 426.16
See application file for complete search history.

(56) References Cited

U.S. PATENT DOCUMENTS

| | | | |
|---|---|---|---|
| 4,698,672 A | 10/1987 | Chen et al. | |
| 5,001,559 A | 3/1991 | Gonzales et al. | |
| 5,408,328 A | 4/1995 | Boliek et al. | |
| 5,675,332 A | 10/1997 | Limberg | |
| 5,710,835 A | 1/1998 | Bradley | |
| 5,748,786 A | 5/1998 | Zandi et al. | |
| 5,802,213 A | 9/1998 | Gardos | |
| 5,821,886 A * | 10/1998 | Son | 341/67 |

(Continued)

FOREIGN PATENT DOCUMENTS

EP 1037165 A2 9/2000

(Continued)

OTHER PUBLICATIONS

Search Report, issued by Swedish Patent Office dated Jun. 16, 2004 (4 pages).

*Primary Examiner* — Samir A Ahmed
*Assistant Examiner* — Ali Bayat
(74) *Attorney, Agent, or Firm* — Finnegan, Henderson, Farabow, Garrett & Dunner, L.L.P.

(57) ABSTRACT

An image representation format for representing a digital image comprises: image information stored as a bitstream representing sequential image blocks, each block comprising one or more components, each component comprising one or more data units and each data unit being represented as a Huffman-coded stream of coefficients of basis functions, wherein a zeroth order coefficient is represented as a difference to the previous zeroth order coefficient of the corresponding component, and a block information table, which comprises: indicators to the first coefficient of a specified order of each image block in said bitstream, information indicating the number of bits in the bitstream between adjacent coefficients of said specified order of the image block, and the zeroth order coefficient of at least the first data unit of each component, said zeroth order coefficient being represented in a non-differential form.

6 Claims, 8 Drawing Sheets

U.S. PATENT DOCUMENTS

| | | | |
|---|---|---|---|
| 5,835,033 A * | 11/1998 | Mita | 341/63 |
| 5,854,857 A | 12/1998 | De Queiroz et al. | |
| 5,963,260 A * | 10/1999 | Bakhmutsky | 375/240.24 |
| 5,970,203 A | 10/1999 | Nishimoto et al. | |
| 6,078,690 A | 6/2000 | Yamada et al. | |
| 6,137,914 A | 10/2000 | Ligtenberg et al. | |
| 6,219,067 B1 | 4/2001 | Dieterich | |
| 6,219,457 B1 | 4/2001 | Potu | |
| 6,374,278 B1 | 4/2002 | Korn et al. | |
| 6,563,440 B1 * | 5/2003 | Kangas | 341/65 |
| 6,589,829 B2 | 7/2003 | Yamazaki et al. | |
| 6,895,122 B2 | 5/2005 | Jones et al. | |
| 6,934,417 B2 | 8/2005 | Easwar et al. | |
| 6,941,019 B1 | 9/2005 | Michell et al. | |
| 6,948,127 B1 * | 9/2005 | Zhu et al. | 715/719 |
| 6,956,511 B2 | 10/2005 | Thomas et al. | |
| 7,310,757 B2 | 12/2007 | Ngo et al. | |
| 7,480,418 B2 | 1/2009 | Niemi et al. | |
| 2001/0016075 A1 | 8/2001 | Klassen | |
| 2001/0017946 A1 | 8/2001 | Klassen | |
| 2005/0213398 A1 | 9/2005 | Khu | |
| 2009/0097761 A1 | 4/2009 | Niemi et al. | |
| 2009/0097762 A1 | 4/2009 | Niemi et al. | |
| 2009/0097767 A1 | 4/2009 | Niemi et al. | |
| 2009/0103823 A1 | 4/2009 | Niemi et al. | |
| 2009/0103824 A1 | 4/2009 | Niemi et al. | |

FOREIGN PATENT DOCUMENTS

| | | |
|---|---|---|
| EP | 1220157 A2 | 7/2002 |

* cited by examiner

METHOD FOR PROCESSING A DIGITAL IMAGE AND IMAGE REPRESENTATION FORMAT

This application is a continuation of U.S. application Ser. No. 12/314,673, filed Dec. 15, 2008, now U.S. Pat. No. 7,831, 101 which claims the benefit from U.S. application Ser. No. 10/989,307, filed Nov. 17, 2004 (which matured as U.S. Pat. No. 7,480,418 on Jan. 20, 2009), and also claims the benefit of Swedish Application No. 0303085, filed Nov. 18, 2003 and Swedish Application No. 0303204-2, filed Nov. 27, 2003, each of which is incorporated herein by reference.

TECHNICAL FIELD OF INVENTION

The present invention relates to a method of processing a digital image and to an image representation format for representing a digital image. The present invention further relates to a method for encoding raw image data into a compressed digital image representation, and a method of analysing a JPEG-compressed digital image.

BACKGROUND TO THE INVENTION

In the society of today, enormous amounts of information are created each day. Much information is presented in the form of images. Further, large portions of the information are stored and presented electronically, for example on the Internet. Meanwhile, there is an increased usage of wireless connections to the Internet, wherein the data transfer rate is relatively low. Thus, there is a need for presenting information in a very compact form. This is especially important for images, since a normal digital image stored as an array of pixels is represented as a quite large data set.

Further, mobile phones incorporating a camera are becoming increasingly popular. Thus, the mobile phone must be able to handle digital images. Mobile phones or other handheld devices that handle images have a limited memory space and limited processing power. Therefore, if image processing is to be performed on such devices, the digital images need to be efficiently and intelligently stored in order to set low requirements on memory space and processing power.

For these reasons, there is a great interest in compressing images. A popular method of compressing images is the JPEG (Joint Photographic Experts Group) standard. The JPEG standard is defined in CCITT Rec. T. 81.

However, for clarity, a short description of the image file format according to the JPEG standard is presented in the following.

The JPEG standard defines a lossy baseline coding system, which is based on the DCT-transformation, and an extended coding system for presenting the transformed image in smaller amount of data. When converting a digital image into JPEG file format, a DCT-transformation and quantization of the image is made, wherein each component of a color space model of the image is separately DCT-transformed. All the color components are represented as blocks, which are treated in sequence. The DCT-transformed blocks are thresholded and quantized in order to discard information of basis functions that have little influence on the perception of the image. The zeroth order coefficient (DC-coefficient) of each component of each block is stored as the difference to the preceding DC-coefficient using Huffman-coding. The higher order coefficients (AC-coefficients) are arranged sequentially, the sequence being obtained by a zigzag order from the array. The AC-coefficients are zero run length coded and further encoded with Huffman-coding.

The JPEG file format is developed in order to create a standard compression that substantially reduces the storage size of a digital image. Thus, the JPEG file format is not suited for manipulation of images. If there is a desire to process a digital image, it is most convenient to transfer the digital image back into a spatial domain representation. However, when processing images on a unit having small storage space, such as a mobile phone, it may not be possible to handle the large storage requirement of the digital image represented in spatial domain.

EP 1037165 describes a method for manipulating digital images stored in JPEG format. The bitstream of the JPEG image is prescanned in order to identify locations of image areas in the bitstream. Designated ones of these locations are stored in a prescan table in order to be easily accessed, whereby selected areas of the image may be accessed without the need to decode the entire bitstream when a portion of the image is to be manipulated. However, there is still a need to further increase the speed of image processing while maintaining low memory requirements.

SUMMARY OF THE INVENTION

It is an object of the invention to provide compressed images that may easily be analyzed and/or manipulated. It is a further object of the invention to provide a possibility to easily stitch digital images into a compressed image representation format.

These and other objects of the invention are, according to a first aspect of the invention, obtained by a method of processing a digital image. The method comprises: providing the digital image in a compressed format, wherein the digital image is represented as a bitstream representing sequential image blocks, each block comprising one or more components, each component comprising one or more data units and each data unit being represented as a Huffman-coded stream of coefficients of basis functions, wherein a zeroth order coefficient is represented as a difference to the previous zeroth order coefficient of the corresponding component, and a block information table comprising: indicators to one zeroth order or first order coefficient of each image block in the bitstream, information indicating the number of bits in the bitstream between coefficients of zeroth or first order in adjacent data units of the image block, and the zeroth order coefficient of at least one data unit of each component, said zeroth order coefficient being represented in a non-differential form. The method further comprises, for each data unit of at least one image block: accessing the zeroth order coefficient of the data unit and Huffman-decoding none or a predetermined number of coefficients of the data unit, skipping the rest of the coefficients by jumping to the next zeroth or first order coefficient in the bitstream using the information in the block information table regarding the number of bits between coefficients in adjacent data units in the bitstream, whereby a reduced set of Huffman-coded coefficients are decoded.

In the context of this application, the term "image block" should be construed as representing a spatial portion of an image, wherein said block may have information from different color model components. Each image block may be represented as one or more sets of coefficients for each color model component.

According to a second aspect of the invention, the objects are obtained by an image representation format for representing a digital image. The image representation format comprises: image information stored as a bitstream representing sequential image blocks, each block comprising one or more components, each component comprising one or more data units and each data unit being represented as a Huffman-coded stream of coefficients of basis functions, wherein a zeroth order coefficient is represented as a difference to the previous zeroth order coefficient of the corresponding component; and a block information table comprising: indicators to one zeroth order or first order coefficient of each image block in said bitstream; information indicating the number of bits in the bitstream between coefficients of zeroth or first order in adjacent data units of the image block; and the zeroth order coefficient of at least one data unit of each component, said zeroth order coefficient being represented in a non-differential form.

According to a third aspect of the invention, there is provided a method for encoding raw image data into a compressed digital image representation. The method comprises: in arbitrary order reading image blocks of a specified size of the raw image data, and for each image block: transforming the image block into one or more data units of one or more components, said transforming creating a representation of each data unit as coefficients of basis functions; calculating a quantized approximation of said coefficients; representing at least some of the quantized coefficients as a stream of coefficients of sequential image blocks; Huffman-coding said stream of coefficients wherein a zeroth order coefficient is represented as a difference to the previous zeroth order coefficient of the corresponding component; storing said Huffman-coded stream of coefficients in a bitstream; storing in a block information table indicators to one zeroth order or first order coefficient of each image block in the bitstream; storing in the block information table information indicating the number of bits in the bitstream between coefficients of zeroth or first order in adjacent data units of the image block; and storing in the block information table the zeroth order coefficient of at least one data unit of each component, said zeroth order coefficient being represented in a non-differential form.

According to a fourth aspect of the invention, there is provided a method of analysing a JPEG-compressed digital image, the JPEG-compressed digital image being represented as a bitstream, wherein said bitstream represents sequential image blocks, each block comprising one or more components, each component comprising one or more data units and each data unit being represented as a Huffman-coded stream of coefficients of basis functions, wherein a zeroth order coefficient is represented as a difference to the previous zeroth order coefficient of the corresponding component. The method comprises: sequentially stepping through the bitstream, and while stepping through the bitstream: storing an indicator in a block information table to one zeroth order or first order coefficient of each image block; decoding the zeroth order coefficients and storing in the block information table the zeroth order coefficient of at least one data unit of each component, said zeroth order coefficient being represented in a non-differential form; and storing in the block information table information indicating the number of bits in the bitstream between coefficients of zeroth or first order in adjacent data units of the image block. The stepping through non-zeroth order coefficients of a data unit in the bitstream, said non-zeroth order coefficients being represented by a sequence of bitstream entries, comprises: looking at a bit sequence of a predetermined number of the following bits in the bitstream; making a table lookup to determine the cathegory and zero run length of at least the first bitstream entry in the bit sequence and to determine the bit length of the first bitstream entry; skipping the number of bits in the bitstream corresponding to the determined bit length; summing the number of skipped bits for gathering information regarding the number of bits in the bitstream between coefficients of zeroth or first order in adjacent data units; and summing the number of coefficients having been stepped through until all coefficients of the data unit have been stepped through or an end of block symbol is encountered.

According to a fifth aspect of the invention, there is provided a method for stitching two digital images. The method comprises: determining a spatial relationship between the two digital images; assigning image blocks of digital image information in the two digital images indices according to the spatial relationship between the two digital images; forming a bitstream representing sequential image blocks according to the assigned indices, wherein each block comprises one or more components, each component comprises one or more data units and each data unit is represented as a Huffman-coded stream of coefficients of basis functions; storing image block information for each image block in a block information table according to the position of the image block, said image block information comprising: indicators to one zeroth order or first order coefficient of each image block in said bitstream, information indicating the number of bits in the bitstream between coefficients of zeroth or first order in adjacent data units of the image block, and the zeroth order coefficient of at least one data unit of each component, said zeroth order coefficient being represented in a non-differential form.

Thanks to at least some of the aspects of the invention, a digital image is represented in an image representation format that requires small storing space, while the digital image in the compressed representation format may still be easily processed. This is especially useful for applications with small storing space and low processing power, such as mobile phones. The invention enables a digital image to be stored in a compressed format, but still be processed and manipulated in real time while presented on a screen. Thanks to the image representation format and the method for processing an image according to the invention, the image may very quickly be presented in reduced scale or with an impaired resolution. The storing of the zeroth order coefficients of the image blocks implies that the zeroth order coefficient need not be calculated using information of the previous zeroth order coefficients. Further, any desired number of non-zeroth order coefficients may be decoded. The rest of the non-zeroth order coefficients in the bitstream may quickly be skipped since the block information table provides information of the bit length between coefficients of adjacent data units enabling fast access to the next data unit. This implies that the image may be quickly decoded in a reduced scale, since there is no need for decoding the non-zeroth order coefficients in the bitstream in order to find the start of the next data unit in the image block or the start of the next image block. Thus, the image representation format allows quick access to a digital image.

The storing of indicators to one zeroth order or first order coefficient of each image block provides quick access to certain portions of the images, without the need for decoding the Huffman-coded stream of coefficients from the start of the stream. Instead, the image block may be accessed directly using the indicator. Further, the zeroth order coefficient of at least one data unit of each component is represented in a non-differential form in the block information table. Thus, the need of calculating the value from the Huffman-coded stream of coefficients is avoided. This enables presentation and manipulation of parts of the digital image, while it is in the compressed image representation format, since parts of the image may be randomly accessed and analyzed.

According to the inventive image representation format, the aim to compress a digital image into minimum size is somewhat relieved. Thus, the size of the digital image is not optimally compressed, but instead some further information on the Huffman-coded stream of coefficients is separately stored in order to enable fast retrieval of certain portions of the image. Especially, it is possible to decode the image or parts of an image very quickly in another scale by Huffman-decoding only a fraction of the non-zeroth order coefficients, and using an inverse discrete cosine transform adapted to a smaller block, such as 4×4, in order to calculate a block of smaller size. The image representation format can easily be transferred into a JPEG image since the image representation format is very similar to the JPEG image format. Thus, it is possible to perform the transfer to a JPEG image and remove the indicators and the stored values of the coefficients, when the image needs no further manipulation.

The Huffman-coded stream of coefficients need not comprise the zeroth order coefficients that are separately stored in the block information table. However, the Huffman-coded stream of coefficients may, anyhow, comprise all coefficients. This may be suitable if the image representation format is to be transferred into another image format, since the bitstream itself may then be directly used in the other image format.

The term "block information table" should not be strictly construed as a table, but merely to the fact that the information stored is stored in a controlled manner where the position of the stored information in the table is related to the spatial position in the image that the information represents. Thus, the block information table may e.g. be divided in several lists or tables. Further, "Huffman-coded stream of coefficients" does not necessarily imply that the entire stream is Huffman-coded. The stream may comprise Huffman-codes that are intermixed with raw data for the coefficients. For example, in a JPEG-compressed file a zero run length and cathegory of coefficients is Huffman-coded and the value of a coefficient within a cathegory is described by uncompressed bits.

By storing the indicators and coefficients in a block information table, a distinct structure of storing the image information is obtained.

An image block may e.g. comprise three color model components, one luminance component and two chrominance components. Representing the digital image in a luminance component and two chromatic components implies that the chromatic components may be represented in a lower resolution without hardly any information perceivable to the eye being lost. Thus, an initial compression of the information in the digital image may be achieved in relation to a representation of the digital image as three chromatic components. Using such a compression, each image block may e.g. comprise four data units for the luminance component and one data unit for each chromatic component. The data units are sequentially ordered in the Huffman-coded stream of coefficients.

According to a sixth aspect of the invention, there is provided an image representation format for representing a digital image. The image representation format comprises: image information stored as a bitstream representing sequential image blocks, each block comprising one or more components, each component comprising one or more data units and each data unit being represented as a Huffman-coded stream of coefficients of basis functions, wherein a zeroth order coefficient is represented as a difference to the previous zeroth order coefficient of the corresponding component, and bitstream information stored in connection to the bitstream, said bitstream information comprising information indicating the number of bits of each data unit in the image blocks.

This image representation format requires a relatively small storage space. The image representation format only holds bitstream information that enables quick creation of a block information table according to the image representation format of the second aspect of the invention. Therefore, this image representation format according to the sixth aspect of the invention is suitable for long-time storing of an image. When the image is accessed, the bitstream information could be used for quickly analysing the bitstream and create a block information table. The information indicating the number of bits of each data unit in the image blocks could be used for quickly accessing the data units. While accessing the data units, the indicators could be created, the information indicating the number of bits between zeroth or first order coefficients of adjacent data units could be gathered, and the zeroth order coefficients could be decoded for storing at least one zeroth order coefficient of each component in a non-differential form.

The bitstream information may be compressed. This implies that the image representation format of the sixth aspect could be even more efficiently stored.

The indicators in the block information table may indicate the bit offset from a static location to the coefficient of said specified order. The static location may e.g. be the start of the bitstream. Thus, the indicators are realized as pointers to a specific bit-position in each image block. This implies that each image block may be quickly retrieved, whereby access to specific parts of the Huffman-coded stream of coefficients may be speeded up.

Alternatively, the indicators in the block information table may indicate the bit offset to the coefficient from a bitstream landmark. The image representation format may then also comprise a list providing information of in which image block each bitstream landmark is located. In this way, the bit offset of the indicator may be stored by a fewer number of bits, since the bit offset from a bitstream landmark is almost always smaller than the bit offset from a static location. This implies that the indicators may be stored using less memory. Instead, a list is needed providing information of in which image block each bitstream landmark is located. Thus, when a specific image block is to be accessed, a check is first made in the list to find the last bitstream landmark before the specific image block. Then, the information on the relevant bitstream landmark and the bit offset from the landmark is used for finding the desired image block in the bitstream.

The indicator may point to a zeroth order or first order coefficient of an image block. When the indicator points to a zeroth order coefficient, the start of a data unit is easily accessed. Then, the zeroth order coefficient needs decoding in order to access the non-zeroth order coefficients, even though the zeroth order coefficient may already be stored in a non-differential format in the block information table. When the indicator points to a first order coefficient, the non-zeroth order coefficients may be directly accessed.

Further, the information indicating the number of bits in the bitstream between coefficients of adjacent data units may indicate the number of bits between any combination of zeroth order and first order coefficients. This information may be used to quickly jump in the bitstream from a data unit to an adjacent data unit. As described above, the information of a data unit is easily accessed either by accessing the zeroth order coefficient or, when the zeroth order coefficient is known from the block information table, directly accessing the first order coefficient. Therefore, the information indicating the number of bits may either indicate the number of bits to the zeroth order coefficient or to the first order coefficient. Likewise, the image representation format is structured in such a way that it is suitable to either indicate the number of bits from the zeroth order coefficient or the first order coefficient.

Also, the indicator may point to a coefficient in any data unit in the image block. Then, the information of the number of bits between adjacent data units may be used for accessing any data unit in the image block. Further, the zeroth order coefficient of the data unit which the indicator points to is preferably stored in the block information table. The zeroth order coefficients of the other data units of the component may be calculated using the information of the difference between the zeroth order coefficients stored in the bitstream. It is suitable that the indicator points to the zeroth or first order coefficient in the first data unit of the image block. Thus, the start of the image block is directly accessed by means of the indicator.

The block information table may comprise the zeroth order coefficient represented in a non-differential form for each zeroth order coefficient that is represented in the bitstream as a difference to a zeroth order coefficient of a previous image block. This implies that each image block may be independently accessed, since the block information table provides all information that is presented in the bitstream as dependent on previous image blocks. According to a specific embodiment, the block information table comprises indicators indicating the bit offset to the coefficient from a bitstream landmark and only the zeroth order coefficients in non-differential form for coefficients that are represented in the bitstream as a difference to a zeroth order coefficient of a previous image block. This embodiment provides a block information table of a small size, which is advantageous where storage capacity is limited.

Alternatively, the block information table comprises each zeroth order coefficient represented in a non-differential form. This implies that there is no need for computing the zeroth order coefficient for data units, whose zeroth order coefficient is represented in the bitstream as a difference to the zeroth order coefficient of a data unit within the image block. Thus, the information of the image block may be more quickly accessed. However, more information is required in the block information table.

Further, the bitstream may represent the digital image in the JPEG-format. Thus, an ordinary JPEG-compression or an already compressed JPEG image may be associated with extra information for quickly accessing, manipulating, and/or analyzing specific parts of the image.

According to an embodiment of the method of the first aspect of the invention, the method further comprises presenting the decoded image blocks to a data handling or data presentation unit, whereby the image or part of the image is presented in a reduced scale. The data handling or data presentation unit may be e.g. a screen, a printer or a hardware unit for performing image processing. The image or parts of the image may be quickly presented on e.g. a screen, since the method in a very fast manner decodes the relevant parts of the digital image for presentation on the screen. This implies that the image may be presented to a user without the user experiencing annoying waiting times.

The method may further comprise performing calculations for image processing on the decoded image blocks. In this way, less calculations are needed since the image is decoded to a reduced set of Huffman-coded coefficients. Therefore, the image processing may be relatively quickly performed.

The method may further comprise presenting results of the performed calculations on a screen as the calculations are performed. The method provides presenting an image stored in a compressed format in real time as the image is selected and presenting manipulations of the image in real time, since the method provides a very fast way of accessing relevant parts of the image and decoding them to a small amount of data so that manipulation may be quickly performed and presented. Further, the method allows defining and performing manipulations of images on a device having a small memory space, such as a mobile phone.

According to an embodiment of the method of the first aspect of the invention, the number of coefficients of the data unit being Huffman-decoded are used to approximate a decoded image block corresponding to a larger number of coefficients. The approximation allows the Huffman-decoded coefficients to represent more coefficients, whereby an image of lower quality may be created or a smaller image having fewer pixels per image block may be created. Although the approximation loses the finest details of the image, the quality of the image may still be satisfactory, since the coarse features of the image are represented by the first coefficients in each data unit.

The predetermined number of coefficients being Huffman-decoded may be e.g. four, nine, thirteen, eighteen or twenty-four. Where four or twenty-four coefficients, respectively, are decoded, the decoded coefficients represent a scaling of each image block from 8×8 pixels to 2×2 pixels and 4×4 pixels, respectively. Where nine, thirteen or eighteen coefficients are Huffman-decoded, the decoded coefficients may be used for approximating a representation of an image block of 4×4 pixels. These numbers of decoded coefficients are especially suitable, since the coefficients immediately following the ninth, thirteenth, and eighteenth coefficients may not be used as information of a 4×4 pixel image block.

According to an embodiment of the image representation format of the second aspect of the invention, the indicators, the information indicating the number of bits between coefficients of adjacent data units and the zeroth order coefficients represented in a non-differential form are stored in one stream in the block information table. In an alternative embodiment, the indicators, the values of the coefficients and the image information are stored in separate memory areas.

According to an embodiment of the method of the fourth aspect of the invention, each bit sequence being looked at comprises sixteen bits. This is especially suitable for the format of bitstream entries. A bitstream entry encoding the non-zeroth coefficients consists of two parts. The first part is Huffman-coded and encodes the zero run length and the cathegory of the value of the current coefficient. The second part is data representing the value of the current coefficient. The first part of the bitstream entry thus holds information of how many coefficients are encoded by the entry (the zero run length+1 coefficient) and how many bits the bitstream entry consists of. Since the first part of a bitstream entry, is at most sixteen bits long, it is suitable to look at sixteen bits. Therefore, when looking at sixteen bits at a time, each bit sequence will always comprise at least the first part of one bitstream entry, and the sixteen bits will therefore hold information on the number of coefficients being encoded by the bitstream entry and the length of the bitstream entry.

Making the table lookup may comprise making a first table lookup of the first eight bits of the bit sequence. If a table lookup is made for the sixteen bits at a time, a table with 65,536 entries is needed, consuming quite a lot of memory. Further, the first part of the most common bitstream entries is eight bits or shorter. Therefore, making a table lookup of the first eight bits will in most cases give the information needed on the bitstream entry.

The first table lookup may return information of the bit length of the first bitstream entry and the number of coefficients being stepped through or return information to a second table lookup. In this way, the first table lookup will either return the information needed on the bitstream entry or return information for analysing the first part of the bitstream entry using the last eight bits of the bit sequence.

Making the table lookup may further comprise making a second table lookup of the last eight bits of the bit sequence to determine the bit length of the first bitstream entry and the number of coefficients being stepped through. Where a second table lookup is needed, the first table lookup may return a pointer to a table to be used in the second lookup depending on the first eight bits. There is only needed a few different tables for the second table lookup, since there are only a few combinations of the first eight bits where the first part of the bitstream entry is longer than eight bits. Thus, when making a table lookup in two steps, there is not needed as many table entries for analysing the first bitstream entry of each bit sequence.

According to an embodiment of the method of the fifth aspect of the invention, some image blocks of one of the digital images is manipulated with information from the other digital image. The manipulation may constitute blending the influence of the image block from the two digital images, if the content in the image block is imaged in both the digital images. This implies that the two digital images may be more smoothly stitched to each other.

According to a further embodiment, image blocks of a part of a first digital image are first handled, whereas the image blocks of the rest of the image are temporarily stored in an uncompressed format. Then, these latter image blocks may be used for calculating the manipulation of the second digital image, before the image blocks of the second digital image are handled.

Further, the stitched image may be transferred to another image compression format, such as the JPEG format, by sequentially accessing the image blocks of the stitched image using the indicators of the image representation format, and storing the stream of Huffman-coded coefficients for sequential image blocks with zeroth order coefficients being represented as a difference to the corresponding previous zeroth order coefficient. Thus, the digital images may be stitched and manipulated while requiring small memory capacity and, when the stitching is complete, the image may be brought into a representation format which is even better compressed.

BRIEF DESCRIPTION OF THE DRAWINGS

The invention will now be described in further detail by way of example under reference to the accompanying drawings, on which.

DETAILED DESCRIPTION OF A PREFERRED EMBODIMENT

In the following description, compression of images will be described with reference to JPEG-compression, although other compressions using other transforms may be contemplated. It should be noted that the scope of protection of the present invention is in no way limited to JPEG-compression.

Figure 1:
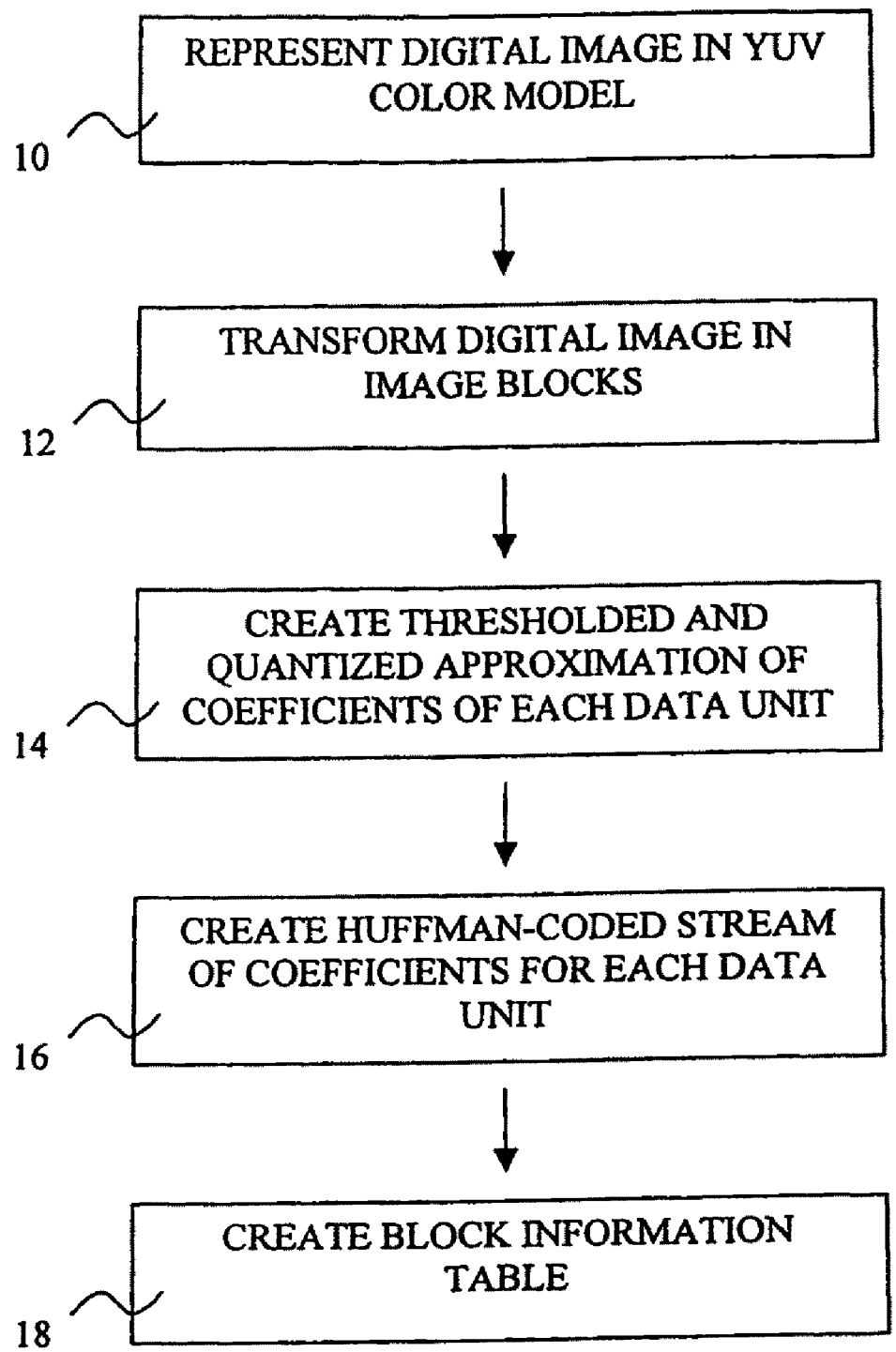
FIG. 1 is a flow chart of a method for compressing a digital image according to an embodiment of the invention.

Referring now to FIG. 1, a method for compressing a digital image will be described. Firstly, the digital image is represented in the YUV color model, step 10, wherein each pixel of the image has three components: luminance, Y, and two chromatic components U and V. The two chromatic components U and V represent color features, whose finest details are difficult to perceive for the human eye. Thus, these components may be represented in a lower resolution than the luminance component. A 16×16 pixel block of the image, which is an example of an image block as defined herein, may be represented by four Y-data units of 8×8 pixels each, one U-data unit of 8×8 pixels, and one V-data unit of 8×8 pixels. This corresponds to a 50% compression of the data set compared to a RGB-representation of the digital image. However, four U-data units and four V-data units may also be used, wherein no compression is obtained compared to the RGB-representation.

The image is processed as discrete 16×16 image blocks in any order. Each data unit of each component is transformed using the discrete cosine transform (DCT), step 12. Since each data unit of each component comprises 64 pixels, the DCT will generate 64 coefficients for the basis functions of the DCT. These coefficients comprise one zeroth order coefficient (DC-coefficient) and 63 coefficients of higher order (AC-coefficients).

Next, a thresholded and quantized approximation of the coefficients of each data unit is created, step 14. The thresholded and quantized approximation is achieved by scaling and truncating each coefficient by dividing it by a value according to a normalization matrix. This implies that the coefficient for basis functions that have been determined to have low perceptual importance is given low weight and a lot of coefficients get the value 0 (zero).

Then, the coefficients are reordered into a stream of coefficients using a zigzag order. According to standard JPEG compression, the DC-coefficients are represented as the difference to the preceding DC-coefficient of the preceding data unit of the same color component and the difference is Huffman-coded. The AC-coefficients are zero run length coded and further coded with Huffman-coding, and stored directly after the Huffman-coded DC-coefficient. When there are only AC-coefficients having a zero value left in the data unit, an end of block code is inserted in the stream of coefficients. Thus, a bitstream of Huffman-coded coefficients of sequential data units and image blocks is obtained. According to an embodiment of the invention, the Huffman-coded coefficients are calculated in a similar manner as for standard JPEG compression, step 16. The bitstream constitutes a compressed representation of the digital image.

However, since a zero run length coding and Huffman-coding is used, the length of each data unit is unknown. Therefore, the start of a data unit is unknown until the bitstream has been decoded from the start of the bitstream to the start of the data unit. Further, since the representation of the DC-coefficient is dependent on the preceding DC-coefficient, the DC-coefficient of a data unit is not known if the preceding DC-coefficient has not been determined by decoding the Huffman-coded stream of previous coefficients.

In order to enable fast retrieval of specific blocks of the image and thereby manipulation and/or analysis of the specific block, a block information table is created, step 18, comprising an indicator to each image block, information indicating the number of bits in the bitstream between adjacent coefficients of a specified order, and a DC-coefficient of each color component of each image block, wherein the DC-coefficient is represented in a non-differential form.

According to other embodiments of the invention, the bitstream of Huffman-coded coefficients may have different content or may be differently stored. For example, since the DC coefficients that depend on a previous image block are already stored in the block information table, they need not be present in the bitstream.

Further, all information on an image block is known from the block information table, which includes the DC coefficients that depend on other image blocks and an indicator to the image block in the bitstream. Thus, the bitstream need not be represented as a specific sequence of image blocks or even be stored in one stream.

Thus, according to one embodiment of the invention, the information is stored in the block information table in a manner where the position of a block information in the table specifies what part of the image it represents. The block information can also be stored in a manner where the position it represents is stored together with the other block information. The Huffman-coded stream of coefficients for the image block may even be stored in connection to the block information. The stored block information may also have a mechanism for determining if the block has been encoded, making it possible to treat the non-encoded blocks as black blocks for instance.

Thus, a package of the Huffman-coded stream of coefficients, and the block information table constitutes a representation of a digital image requiring small storage capacity, while enabling analysis and manipulation of specific parts of the image without the need of decoding the entire image. This enables also compression of the image in a non-linear fashion, where the order in which the blocks are compressed is not essential.

Figure 2A:
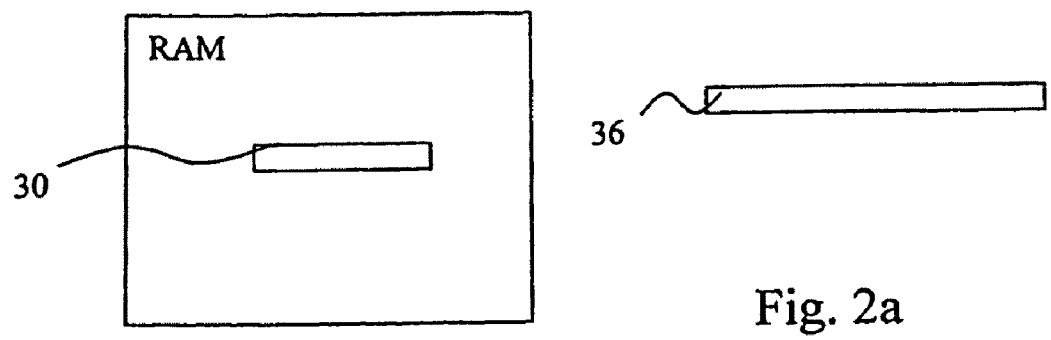
FIGS. 2*a-c* are schematic views of the image representation format according to embodiments of the invention.
Figure 2B:
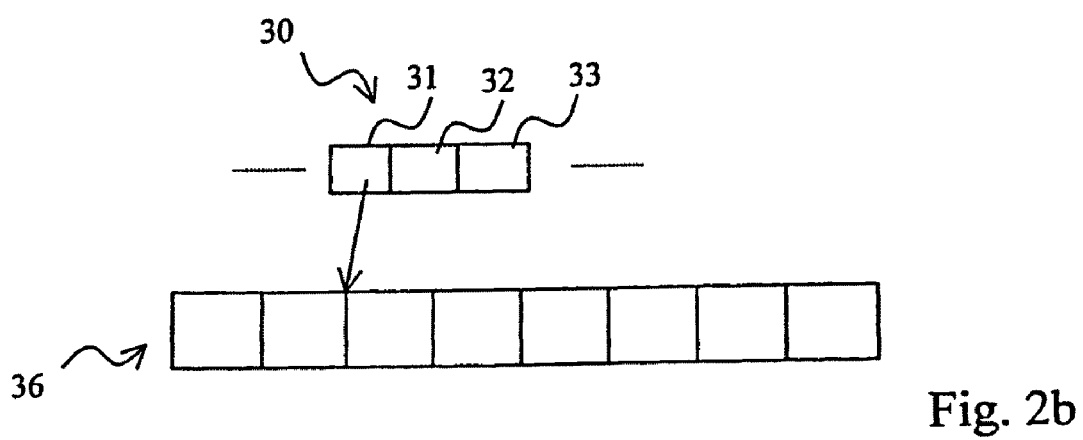

Referring now to FIG. 2*a*, the structure of the compressed image representation format is presented. The block information table may be stored in the RAM of a device, while a random access for reading or writing image blocks is needed by the device. As shown in FIG. 2*b*, the block information table 30 and the bitstream of Huffman-coded coefficients 36 may be stored in separate memory spaces. The block information table 30 comprises the indicator 31, the information 32 indicating the number of bits in the bitstream between coefficients of zeroth or first order in adjacent data units, and the DC coefficients stored in a non-differential form 33. Then, the indicator 31 of the block information table 30 comprises an indication to the first coefficient of a specified order of the image block in the bitstream 36.

Figure 2C:
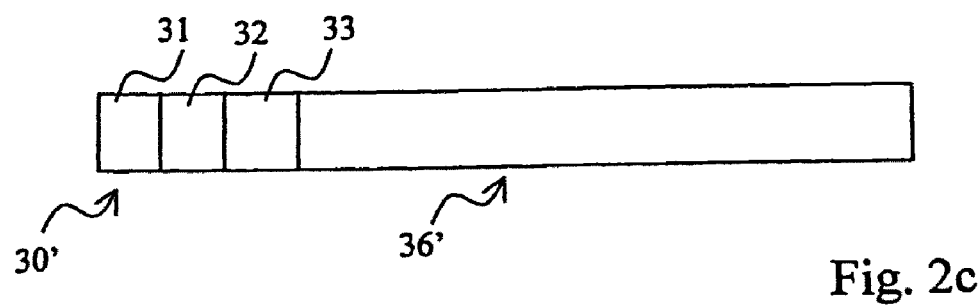

As an alternative shown in FIG. 2*c*, the block information table 30' may be stored as a header or as a special marker to the bitstream 36', which may constitute a standard JPEG-format.

Also, it is realized that when information is stored in the header of the bitstream, the header need not comprise all information needed in the block information table. Instead, the header may comprise information for allowing the block information table to be very quickly created. The header of the bitstream 36' may thus only hold information of the lengths of each data unit. Then, when the image is accessed, the block information table may be quickly created and loaded into RAM. Using the lengths of data units, the information needed in the block information table may be quickly accessed. The data units are stepped through while creating indicators to the start of each image block, decoding and storing the DC coefficients and updating the information indicating the number of bits in the bitstream between coefficients of zeroth or first order in adjacent data units.

This header may even be compressed, e.g. Huffman-coded, in order to save storage space. The length information has values that only vary slightly. Therefore, Huffman-encoding the lengths in a manner corresponding to the encoding of DC-coefficients would substantially compress the information. The substantial compression of the file implies that the file may be stored in a space-effective format while allowing the block information table to be quickly created. The header is then decoded when the image is accessed.

However, it should be noted that the invention is in no way restricted to these presented manners of representing the image.

The indicator 31 may point to the first zeroth order coefficient of the image block. However, since the zeroth order coefficient is provided in the block information table, there is no need to access the zeroth order coefficient. Thus, the indicator 31 may alternatively point to the first order coefficient of the image block. The indicator may be implemented as a bit offset from a static location in the bitstream to the coefficient of a specified order in the image block. Preferably, the indicator provides information of the bit offset to the coefficient from the start of the bitstream.

The indicator 31 may alternatively indicate the bit offset to the coefficient from a bitstream landmark. If the indicator 31 indicates the bit offset from the start of the bitstream, a bitstream of a size larger than 2 Mbytes would require indicators represented by 4 bytes. The bitstream landmarks may be placed in the bitstream such that an indicator 31 may be represented by 2 bytes. When the offset becomes greater than e.g. 65536 bits (the largest number represented by 2 bytes), a bitstream landmark is registered. The bitstream landmarks are sequentially numbered. A list of bitstream landmarks is created providing information on which image block each bitstream landmark is situated in. When an image block is to be accessed using the indicator, the access is made in two steps. First, a comparison is made to the list of bitstream landmarks to find the number of the bitstream landmark located closest in the bitstream before the image block to be accessed. Then, the bit offset of the image block from the start of the bitstream may be calculated as (number of the bitstream landmark)*65536+bit offset provided by the indicator. Of course, any number of bits could be used between the bitstream landmarks.

The information indicating the number of bits between adjacent coefficients of the specified order could be used for quickly accessing specific data units within an image block. There is no need for decoding the previous data unit in order to know where a data unit starts. This could be advantageously used for quickly decoding image blocks to a reduced set of decoded coefficients, as described in more detail below.

The block information table may comprise the DC coefficient represented in a non-differential from for each data unit. This provides that there is no need for calculating the DC coefficient for any data unit. However, the block information table may alternatively comprise only the DC coefficients that are represented in the bitstream as a difference to a DC coefficient of a previous image block. Where an image block comprises several data units for each component, there is only a need for storing the DC coefficient of the first data unit of each component. This implies that the block information table requires less storage space.

The structure of the compressed image representation format may also be obtained by starting from an already compressed JPEG-file. Then, the JPEG-file is decoded in order to determine the indicators to each image block, information indicating the number of bits between adjacent coefficients of specified order, and a DC-coefficient in a non-differential form for each component of each image block. Thus, the indices and the DC-coefficients are stored in the block information table, while the Huffman-coded stream of coefficients is kept intact. The AC coefficients of such a JPEG image may alternatively be copied to a new memory space, whereby all information of the JPEG image will be accessible without the need of keeping the original JPEG image stored in the device.

The thus created image representation format opens the possibilities of performing image processing directly on a JPEG-file.

A specific method for analysing a JPEG image in order to create the image representation format will now be described. The method comprises sequentially stepping through the bitstream for gathering the information needed. While stepping through the bitstream, the indicators to each image block, the information indicating the number of bits in the bitstream between adjacent coefficients of specified order, and the DC coefficients of at least the first data unit of each component are stored in the block information table.

While stepping through the bitstream, the DC coefficients for the components are decoded and the last coefficient is temporarily stored for enabling determination of the next DC coefficient.

Figure 3:
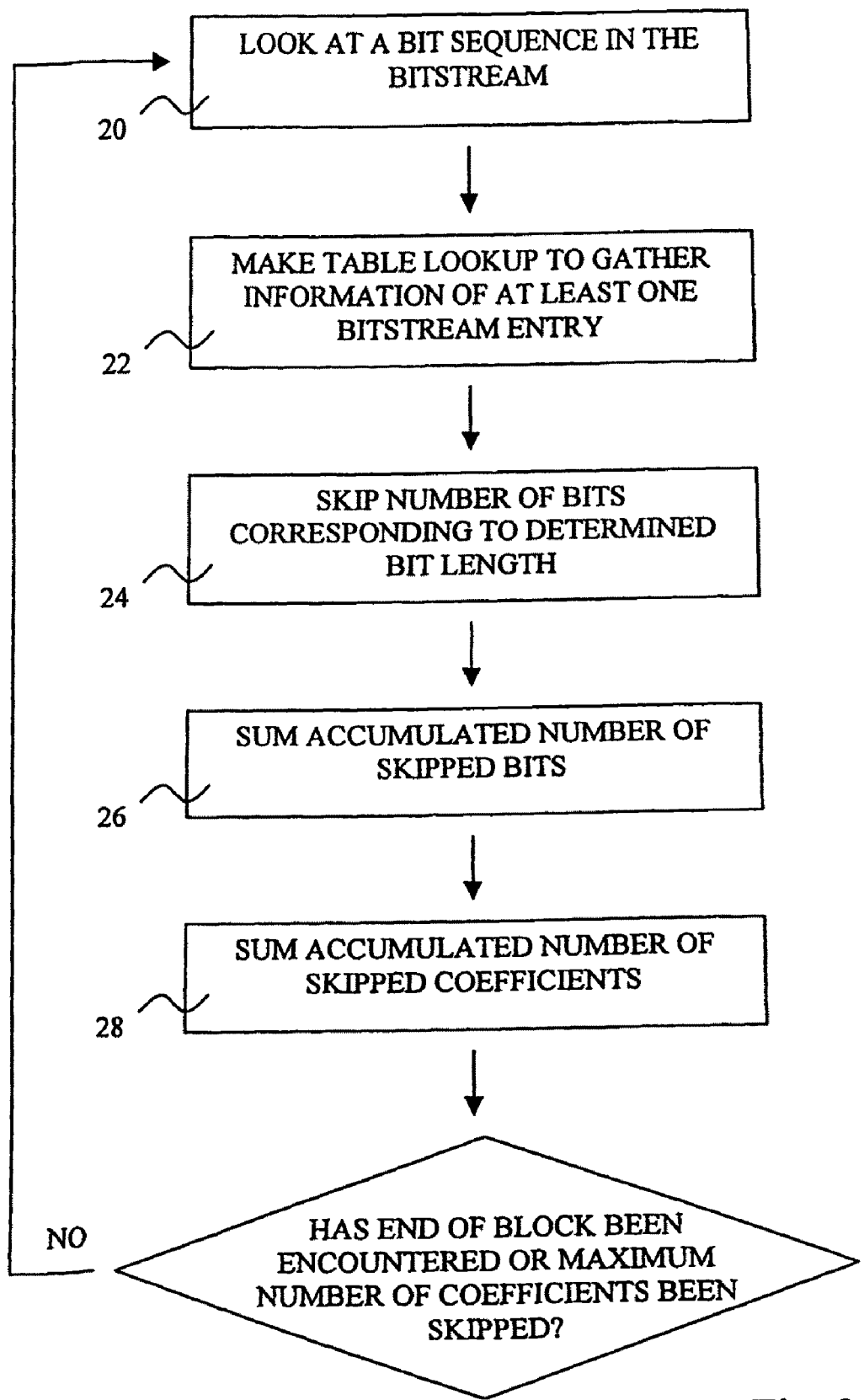
FIG. 3 is a flow chart of a method of analysing a data unit in the bitstream.

Referring to FIG. 3, the stepping through AC coefficients of a data unit in the bitstream will be described. The analysis only wants to determine where the next data unit starts and the number of bits between the DC coefficients or first AC coefficients of adjacent data units. Therefore, it is not necessary to decode the AC coefficients.

A bitstream entry of the AC coefficients consists of two parts. The first part is a Huffman-code that encodes how many zero coefficients precedes the current coefficient and in which cathegory the value of the current coefficient is. The cathegory determines the number of bits of the second part of the bitstream entry, which encodes the actual value of the coefficient. Thus, by analysing the first part of the bitstream entry, the number of coefficients encoded by the bitstream entry and the number of bits used by the bitstream entry may be determined.

The stepping through AC coefficients comprises looking at a bit sequence of a predetermined number of bits in the bitstream, step 20. Preferably, the bit sequence is 16 number of bits long, corresponding to the longest first part of any bitstream entry. Thus, by looking at 16 bits at a time, the needed information may always be gathered for at least one bitstream entry. The information is gathered by making a table lookup, step 22. The table lookup thus returns the bit length of at least the first bitstream entry being present in the bit sequence and the number of coefficients being encoded by the Huffman-code. Then, a number of bits is skipped corresponding to the determined bit length, step 24. The accumulated number of skipped bits is summed, step 26 and the accumulated number of skipped coefficients is summed, step 28. If an end of block symbol has not been encountered and the maximum number of coefficients of a data unit has not been skipped, the process is returned to step 20 and a new bit sequence is looked at.

The table lookup in step 22 may be performed in two steps. First, a table lookup is made for the first eight bits in the bit sequence. This lookup is sufficient to determine the first part of the Huffman-code for most of the lookups for normal JPEG images. If the first table lookup is sufficient for determining the first part of the first Huffman-code, the last eight bits are not analysed further at this point. If the first part of the Huffman-code is longer than eight bits, a further table lookup is needed. The first table lookup then returns a pointer to a new table, where a lookup of the last eight bits is to be made. The pointer is dependent on the first eight bits of the bit sequence. The second table lookup will then determine the number of bits of the Huffman-code and the number of coefficients being skipped. The second table lookup may be made in different tables or in different parts of the same table. There are only a few variants of the first eight bits of Huffman-codes that are longer than eight bits. Therefore, the number of entries in the second table are limited and much fewer than 65536 (i.e. the total number of possible sixteen bit sequences).

Alternatively, the table lookup in step 22 is performed in one step. Then, a table lookup is performed for a 16 bit code. This table lookup may in some cases return information of two or more Huffman-codes. Thus, where the bit sequence comprises the first part of several Huffman-codes, these Huffman-codes may be simultaneously skipped. It is also possible to skip several Huffman-codes simultaneously when making a lookup for eight bits. However, there are only a few Huffman-codes being short enough to give the needed information in eight bits.

Figure 4:
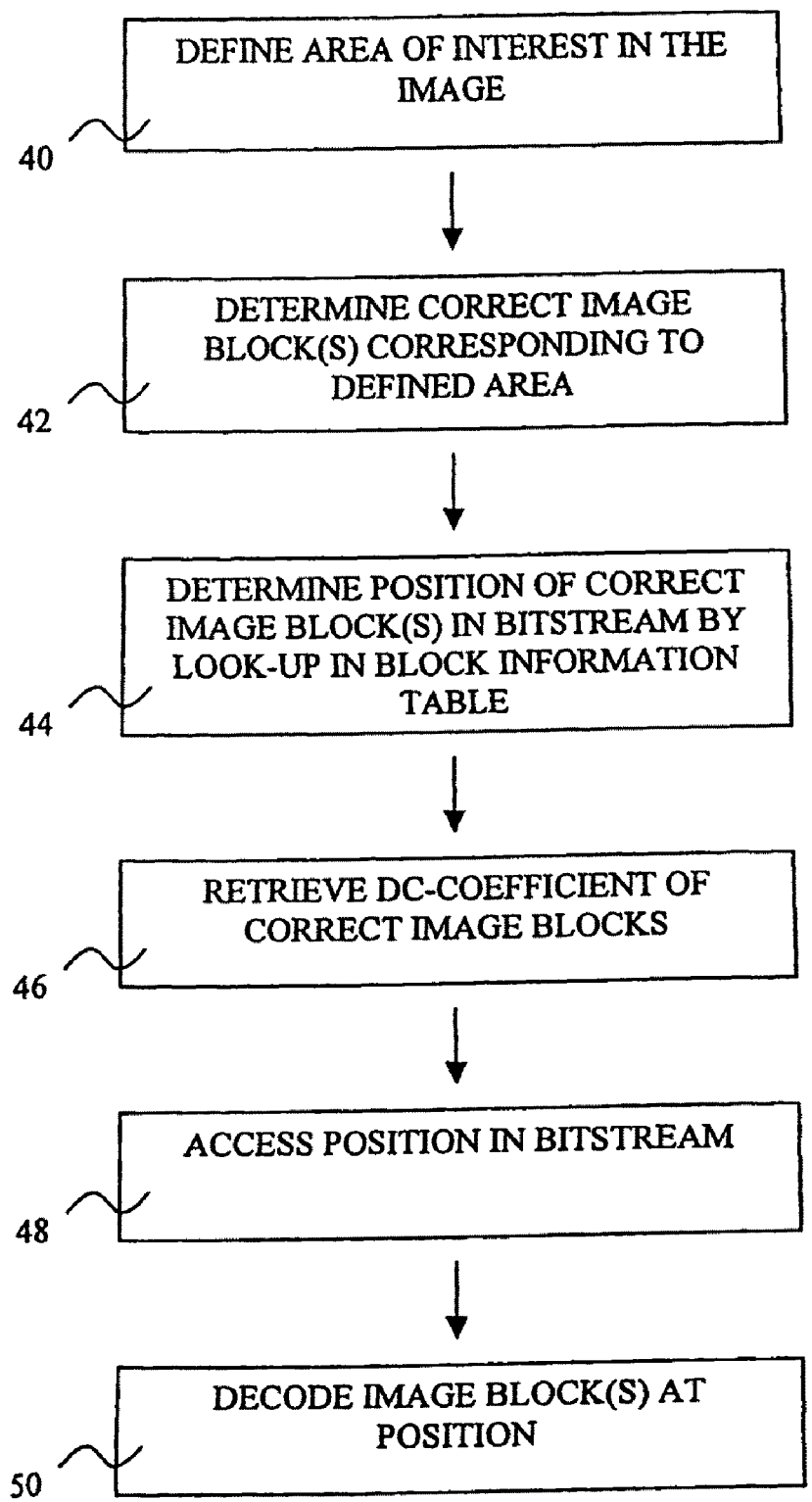
FIG. 4 is a flow chart of a method for reading a specific part of a digital image stored in a compressed image file format.

Referring now to FIG. 4, a method of reading a specific part in a digital image stored in the image representation format will be described.

First, the position or area of interest in the image is defined, step 40. Then, the correct image block or blocks corresponding to the defined position or area is determined by simply correlating the displacement to the right and down, respectively, from the upper left corner to the sequence of image blocks, step 42. Thereafter, the position of the correct image block or blocks in the bitstream is determined by looking up in the block information table, step 44. Further, the DC-coefficient of the correct image block or blocks is retrieved from the block information table, step 46. Next, the position in the bitstream is accessed, step 48, and the image block at this position is decoded, step 50, using the retrieved DC-coefficient.

Figure 5:
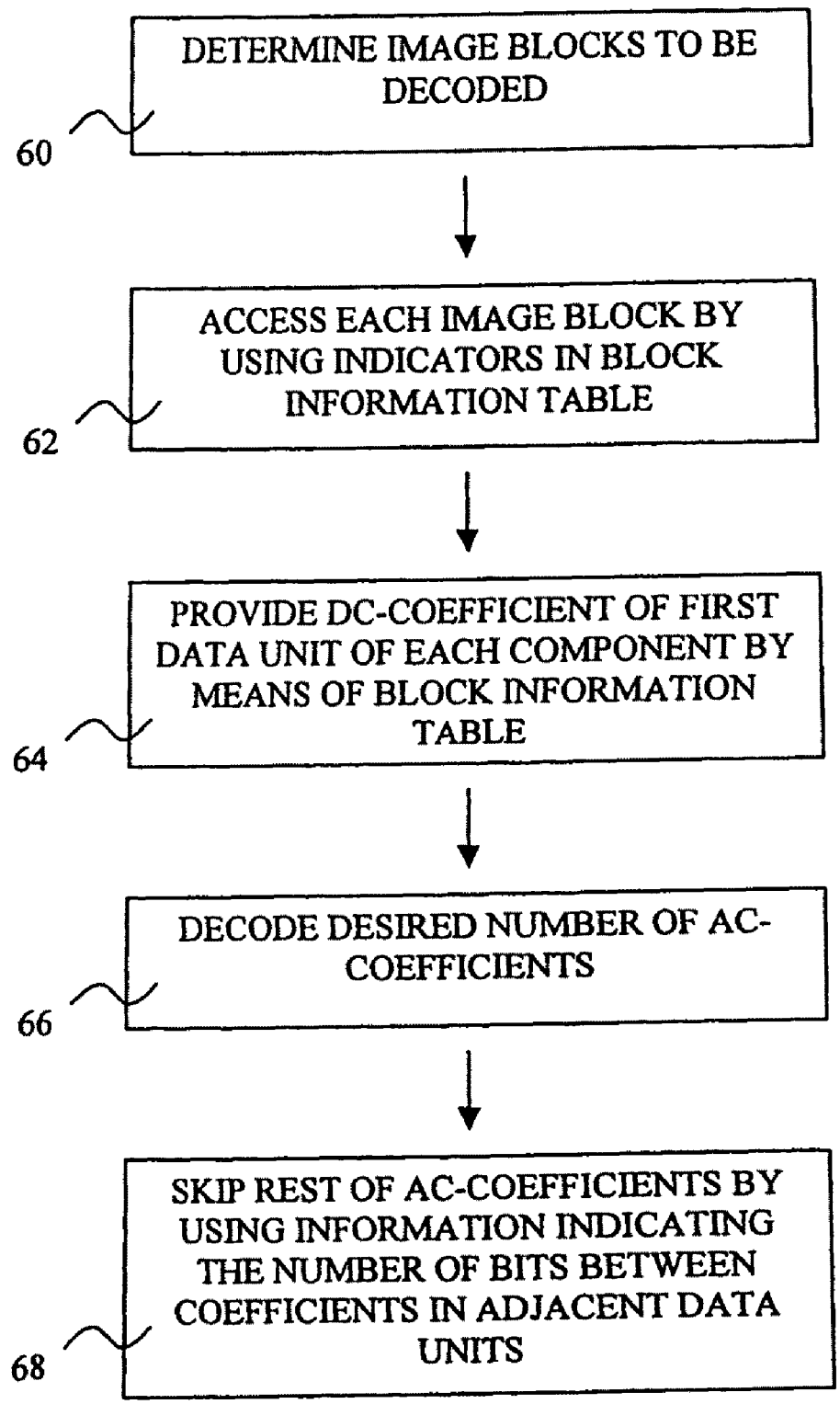
FIG. 5 is a flow chart of a method for decoding a data unit for manipulation of a digital image stored in a compressed image file format according to an embodiment of the invention.

Referring now to FIG. 5, a method for processing and manipulating a digital image stored in the image representation format will be described. The processing and manipulation of the digital image is so quick that it may be performed and displayed on a mobile phone in real time to a user. Thus, the user may define the manipulations to be performed and see them be performed within a few seconds.

First, the user may define an image or part of an image to be displayed. In order to allow the image to be quickly decoded for display on a screen, only a reduced set of Huffman-coded coefficients are decoded for each data unit. The reduced set of coefficients may be used to approximate the image with impaired resolution or to show an image with fewer pixels. The number of AC coefficients being decoded may suitably be none, reducing an 8×8 pixel image block to 1 pixel, four, reducing the image block to 2×2 pixels, or twenty-four, reducing the image block to 4×4 pixels. When reducing the image block to 4×4 pixels, a fewer number of AC coefficients may be decoded for approximating the 4×4 pixel image block. Thus, nine, thirteen, or eighteen coefficients may e.g. be decoded. Since the main information of each image block is placed in the first coefficients, the information lost in the non-decoded coefficients is not very significant.

Thanks to the image representation format, the reduced set of Huffman-coded coefficients may very quickly be retrieved and decoded for displaying the image or part of the image. First, the image blocks to be decoded are determined, step 60. Each image block is accessed by using the indicators in the block information table, step 62. The DC coefficient of the first data unit of each component is also provided by the block information table, step 64. Then, the desired number of AC coefficients are decoded, step 66. Thereafter, the next data unit of the image block is quickly retrieved by skipping the rest of the AC coefficients using the information indicating the number of bits between e.g. the first AC coefficients in adjacent data units, step 68. Now, the next data unit may be decoded. In this way, the image is very quickly decoded for presentation on a screen, reducing annoying waiting times for a user. This is especially useful when using a unit with low processing power and small storage space, such as a mobile phone.

The user may then define a manipulation to be performed on the image being presented on the screen. The calculations needed for the manipulation may now be performed on the reduced sets of Huffman-decoded coefficients. Thus, the calculations may be more quickly performed and the results may be shown on a display in real time, without the user experiencing long waiting times.

Figure 6:
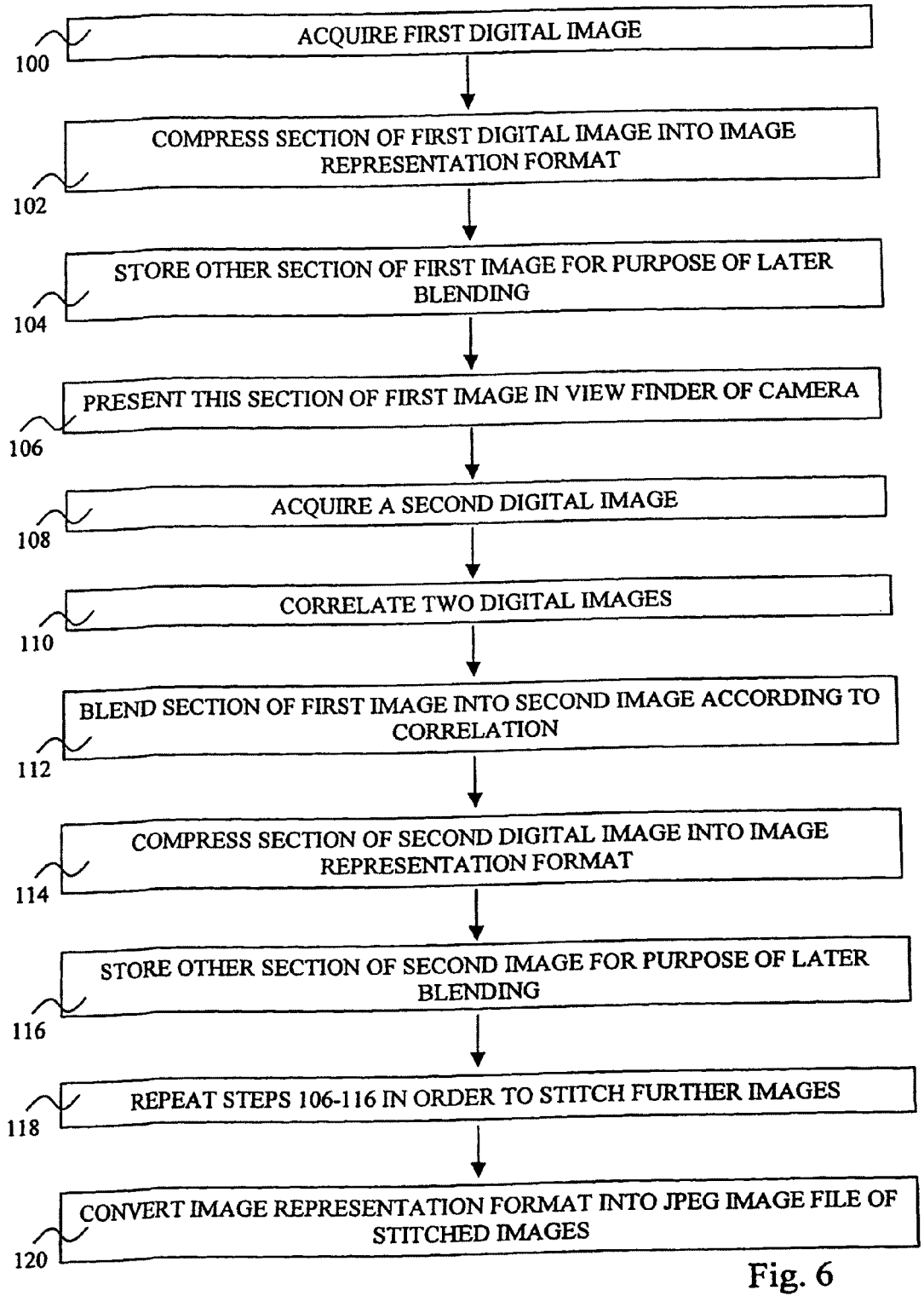
FIG. 6 is a flow chart of a method for stitching two digital images into a compressed image file format according to an embodiment of the invention.
Figure 7:
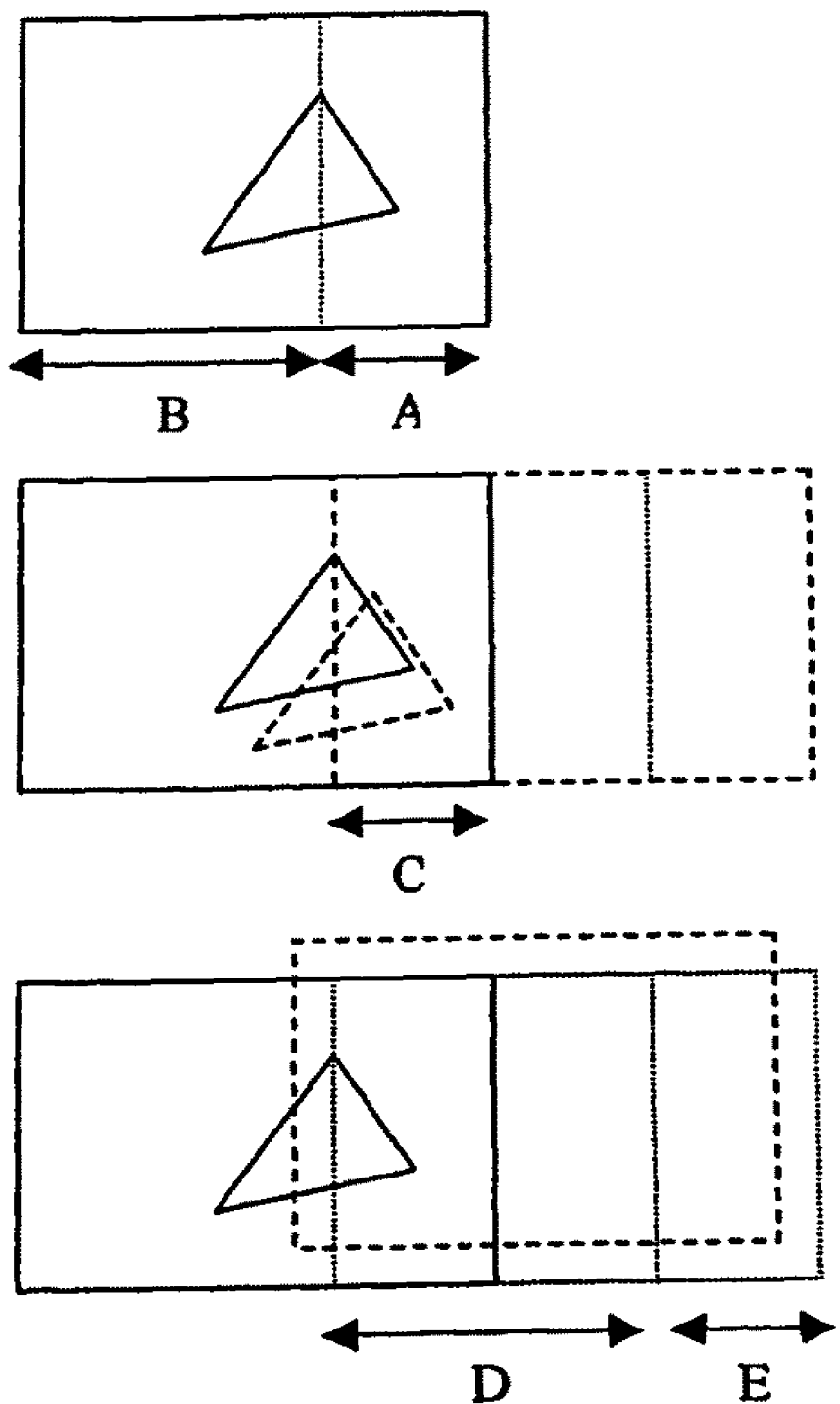
FIG. 7 is a schematical overview of the stitching of two digital images.
Figure 8:
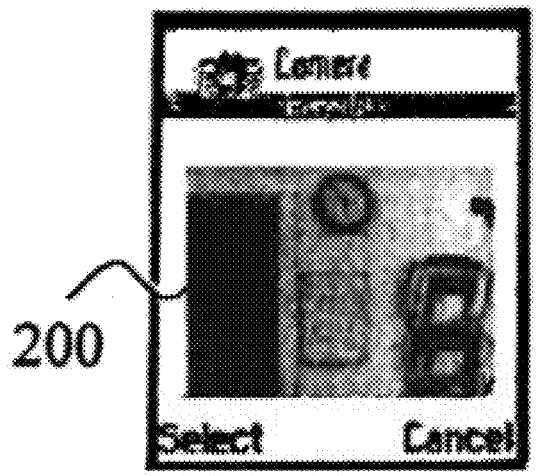
FIGS. 8-9 are screen shots of a device capturing digital images and stitching the digital images into a compressed image file format.
Figure 9:
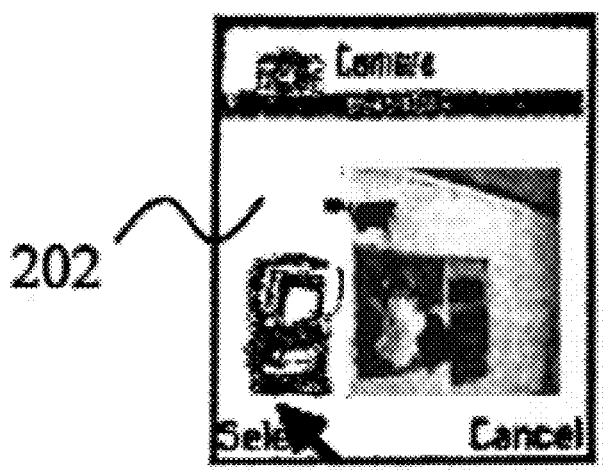

Referring now to FIGS. 6-9, a method for stitching two digital images into, a compressed image file format will be described. In FIG. 6, a flow chart presenting an overview of the method is shown. In FIG. 7, a schematical overview of the stitching of images is shown, whereas FIGS. 8-9 show different steps of the method when it is implemented in a device for acquiring images, such as a mobile phone with an embedded camera.

Firstly, a first digital image 200 is acquired, step 100, the content of the digital image being shown in the view finder of a camera in FIG. 8. The acquired image is then transformed in order to account for lens corrections and for making a projection of the corrected image onto a cylinder. Thus, the acquired image is adapted for being stitched to another image for creating a panorama image. A section B of this digital image 200 is then compressed into the compressed image representation format as described with reference to FIG. 1, step 102, wherein the image blocks are assigned indices of positions in the image according to their current spatial position in the image. The other section A of the image is stored, step 104, for the purpose of a blending operation to be performed later. If the user would like to create a panoramic image, the direction of panorama could be defined in the device for acquiring images. Then, a section of the acquired first digital image 200 closest to the direction of panorama is stored as the section stored for the purpose of blending.

This section A of the first image may be presented in the view finder of the camera, step 106, when a second image is to be captured. The section of the first digital image may be presented in a first layer on the view finder, wherein every second pixel is transparent, so that the object space viewed by the camera and presented in a second layer on the view finder may be perceived behind the section of the first digital image, as shown in FIG. 9. If a panorama is made in a right-hand direction, a rightmost section of the first digital image will be presented in the leftmost part of the view finder. If the camera itself performs the lens correction and cylindrical projection, as described above, in real time, the stored section A of the first image may simply be presented in the view finder. However, if no correction is performed in real time by the camera, the section A is inverse transformed as placed in the leftmost position in the view finder in order to better fit the object space shown in the view finder. Thus, the user is guided to acquire a second image 202, step 108, that positions corresponding objects in the first and second digital image in an overlapping region in the view finder. The acquired image is then transformed in order to account for lens corrections and for making a projection of the corrected image onto a cylinder.

The second digital image now comprises a section C which essentially corresponds to the section A of the first digital image. Thus, the camera may easily correlate the two digital images to each other, step 110, so that the two images may be correctly stitched to each other. Of course, the correlation between the two digital images may be obtained in any other way. For example, a computer unit may calculate and find the correlation between the two images, or the correlation may be defined by a user, e.g. when there are no overlapping regions. The correlation determines a displacement of the images in relation to each other.

Next, the section A stored for blending is blended into the second image according to the correlation, step 112. Then, a section D of the second image is compressed with correct indices of the image blocks, according to the determined displacement, into the compressed image representation format as described with reference to FIG. 1, step 114. Further, another section E of the second image is stored in an uncompressed format, step 116, for the purpose of a blending operation to be performed if further images are to be captured into the panorama. As seen in FIG. 7, due to the displacement of the two captured images in relation to each other, section E may comprise portions that hold no image information. Thus, the storage of the image section E has a mechanism for determining if a pixel stored represents image data or unknown information due to the displacement. This information is later used by the blending and may also be used in the correlation operation.

Then, the steps 106-116 are repeated, if desired, in order to stitch further images to the already stitched images, step 118. The last added image is compressed in its entirety into the image representation format as described with reference to FIG. 1.

Next, the largest rectangular image that is possible to form from the two or more digital images is determined, and the first image block that fully fits into the rectangle in the upper left corner is determined. Then, the image representation format is converted into a JPEG image file of the stitched images, step 120, by entering the Huffman-coded stream of coefficients of the sequential blocks, starting from the determined block and moving left to right and top to bottom through the determined largest rectangular image. In this manner, a large, stitched image will be represented in a JPEG image file format. The stitched digital images can now be displayed on a screen of the mobile phone that includes the camera.

Although the method for stitching has been described as a sequence, wherein a first digital image is first compressed into a compressed image file format and the second digital image is later added to this compressed image representation format, it is contemplated that the compressed image representation format may be created by directly incorporating the two digital images into the compressed image representation format or alternatively that the two digital images may each be represented in a compressed image file format and combined into one large image via a representation in the compressed image representation format.

Now, in contrast to stitching images, a method for cropping a JPEG baseline encoded image will be described. First, the JPEG image is analyzed by decoding the Huffman-coded data. During this decoding, indicators to each image block and information indicating the number of bits between data units is stored in the block information table. Further, the DC coefficient for the first data unit of each color component in each image block is calculated and stored in the block information table. Now, the cropping of a JPEG image into a new JPEG baseline encoded representation of a portion of the image is accomplished by first determining an area to be withheld from the cropping. For the leftmost image block in each row of the area, a new difference of the DC coefficients needs to be calculated using the DC coefficient information in the block information table. Thereafter, the representation of the rest of the row could simply be bitwise copied from the Huffman-coded data of the original JPEG image to the new JPEG image using the indices in the block information table to determine the bit length to be copied. Thus, a new, cropped JPEG image may very easily be created.

If the cropping of the JPEG image is to be performed into an uncompressed representation of the image instead, the image blocks in the area are decided and decoded into the correct position in the uncompressed representation of the image using the indices in the block information table. The decoding is performed using the DC coefficients in the block information table, whereby the entire Huffman-coded data need not be decoded at this instance.

Further, the JPEG image may also be manipulated by processing the image, while the image information is represented as the DCT coefficients. By converting the JPEG image to the image representation format presented herein, manipulations may be performed on the image blocks, while they are represented as DCT coefficients. Thus, using matrix operations, the image may e.g. be rotated or scaled.

It should be emphasized that the preferred embodiments described herein is in no way limiting and that many alternative embodiments are possible within the scope of protection defined by the appended claims.

The invention claimed is:

1. A method for decoding a digital representation of an image, comprising:
reading information of a bit length between coefficients of adjacent data units, a present data unit, and a next data unit, the information being read from a block information table associated with the digital representation of the image using a processor;
skipping coefficients in the present data unit by using the information of the bit length between coefficients of the adjacent data units from the block information table to find the start of the next data unit using the processor;
repeating the acts of reading and skipping using the processor, wherein the adjacent data units are a new pair of adjacent data units;
accessing and decoding using the processor a specified number of non-zeroth order coefficients of the next data unit in the digital representation of the image when the start of the next data unit has been found; and
repeating the accessing in connection with repeating the reading and skipping.

2. The method according to claim 1, wherein the specified number of non-zeroth order coefficients to be accessed and decoded is at least two.

3. The method according to claim 1 or 2, further comprising:
reading in the block information table a zeroth order coefficient relating to the next data unit when the start of the next data unit has been found; and
repeating this act of reading a zeroth order coefficient in connection with repeating the acts of reading information of the bit length and skipping.

4. A method for generating bitstream information to be stored on a non-transitory computer medium in connection to an image representation,
said image representation comprising: image information stored as a bitstream representing sequential image blocks, each block comprising one or more components, each component comprising one or more data units and each data unit being represented as a Huffman-coded stream of coefficients of basis functions, wherein a zeroth order coefficient is represented as a difference to a previous and adjacent zeroth order coefficient of the corresponding component,
said method comprising generating bitstream information to be stored in connection to the bitstream, said bitstream information comprising information indicating the number of bits of each data unit in the image blocks,
said bitstream information allowing, by using said information indicating the number of bits, coefficients determined not to be decoded to in said each image block be skipped, thereby enabling a reduced set of decoded coefficients for each image block to be obtainable.

5. A method for extracting bitstream information stored on a non-transitory computer medium in connection to an image representation,
said image representation comprising: image information stored as a bitstream representing sequential image blocks, each block comprising one or more components, each component comprising one or more data units and each data unit being represented as a Huffman-coded stream of coefficients of basis functions, wherein a zeroth order coefficient is represented as a difference to a previous and adjacent zeroth order coefficient of the corresponding component,
said method comprising extracting bitstream information stored in connection to the bitstream, said bitstream information comprising information indicating the number of bits of each data unit in the image blocks,
said bitstream information allowing, by using said information indicating the number of bits, coefficients determined not to be decoded to in said each image block be skipped, thereby enabling a reduced set of decoded coefficients for each image block to be obtainable.

6. A method for decoding a digital representation of an image, comprising:
reading bitstream information representing a digital representation of an image using a processor;
selectively accessing a desired number of first data unit coefficients in said bitstream using the processor;
reading a bit length between a first one of first data unit coefficients of a first data unit associated with a first image block represented by a first part of the bitstream information and a first one of second data unit coefficients of a second data unit associated with a second image block represented by a second part of the bitstream information from a block information table using the processor;
determining a number of first data unit coefficients to be skipped using the processor;
skipping, by using the read bit length, the determined number of first data unit coefficients to selectively access a desired number of second data unit coefficients using the processor; and
constructing the digital representation from the selectively accessed first data unit coefficients and second data unit coefficients using the processor.

* * * * *

UNITED STATES PATENT AND TRADEMARK OFFICE
CERTIFICATE OF CORRECTION

PATENT NO. : 7,965,897 B2  
APPLICATION NO. : 12/654868  
DATED : June 21, 2011  
INVENTOR(S) : Sami Niemi et al.

Page 1 of 1

It is certified that error appears in the above-identified patent and that said Letters Patent is hereby corrected as shown below:

On the Title Page, Item (63), in the 'Related U.S. Application Data', line 2, "now Pat. No. 7,831,101." should read --now Pat. No. 7,831,101, which is a continuation of application No. 10/989,307, filed on Nov. 17, 2004, now Pat No. 7,480,418.--.

On the Title Page, after Item (63), the 'Related U.S. Application Data' and before Item (51), the 'Int. Cl.' data', insert the following missing foreign priority data:

--(30)   Foreign Application Priority Data  
    Nov. 18, 2003 (SE) ............... 0303085  
    Nov. 27, 2003 (SE) ............... 0303204-2--.

Signed and Sealed this  
Seventh Day of February, 2012

David J. Kappos  
*Director of the United States Patent and Trademark Office*